HALL ELEMENT MAGNETIC TRANSDUCER

Filed March 7, 1957 3 Sheets-Sheet 1

Inventors
Marvin Camras
James J. Brophy by Hill, Sherman, Meroni, Gross & Simpson Attys.

Inventors
Marvin Camras
James J. Brophy by Hill, Sherman, Meroni, Gross & Simpson Attys.

HALL ELEMENT MAGNETIC TRANSDUCER

Filed March 7, 1957 3 Sheets-Sheet 3

Inventors
Marvin Camras
James J. Brophy
by Hill, Sherman, Meroni, Gross & Simpson Attys.

United States Patent Office 3,114,009
Patented Dec. 10, 1963

3,114,009

HALL ELEMENT MAGNETIC TRANSDUCER

Marvin Camras, Glencoe, and James J. Brophy, Western Springs, Ill., assignors to Armour Research Foundation of Illinois Institute of Technology, Chicago, Ill., a corporation of Illinois Filed Mar. 7, 1957, Ser. No. 644,641
19 Claims. (Cl. 179—100.2)

This invention relates to a novel electromagnetic transducer head, and particularly to a transducer head responsive directly to magnetic flux rather than to the rate of change thereof as in conventional magnetic playback heads.

It is an object of the present invention to provide a novel flux responsive electromagnetic transducer head.

It is a further object of the present invention to provide a transducer head of relatively simple construction.

It is a further object of the present invention to provide a novel apparatus and method for reproducing signals recorded magnetically on a magnetic record medium.

Other objects, features and advantages of the present invention will be more fully apparent from the following detailed description taken in connection with the accompanying drawings, in which.

The present invention is based on the observation that in certain materials when an electric current is set up in one direction through the material, and a magnetic field is applied at right angles to the direction of current flow, an electromotive force is generated in the direction at right angles both to the direction of current flow and to the direction of the magnetic field. It is found that this effect which is known as the Hall effect can be successfully utilized in reproducing signals recorded on a magnetic record medium.

Figures 1, 2, 3:
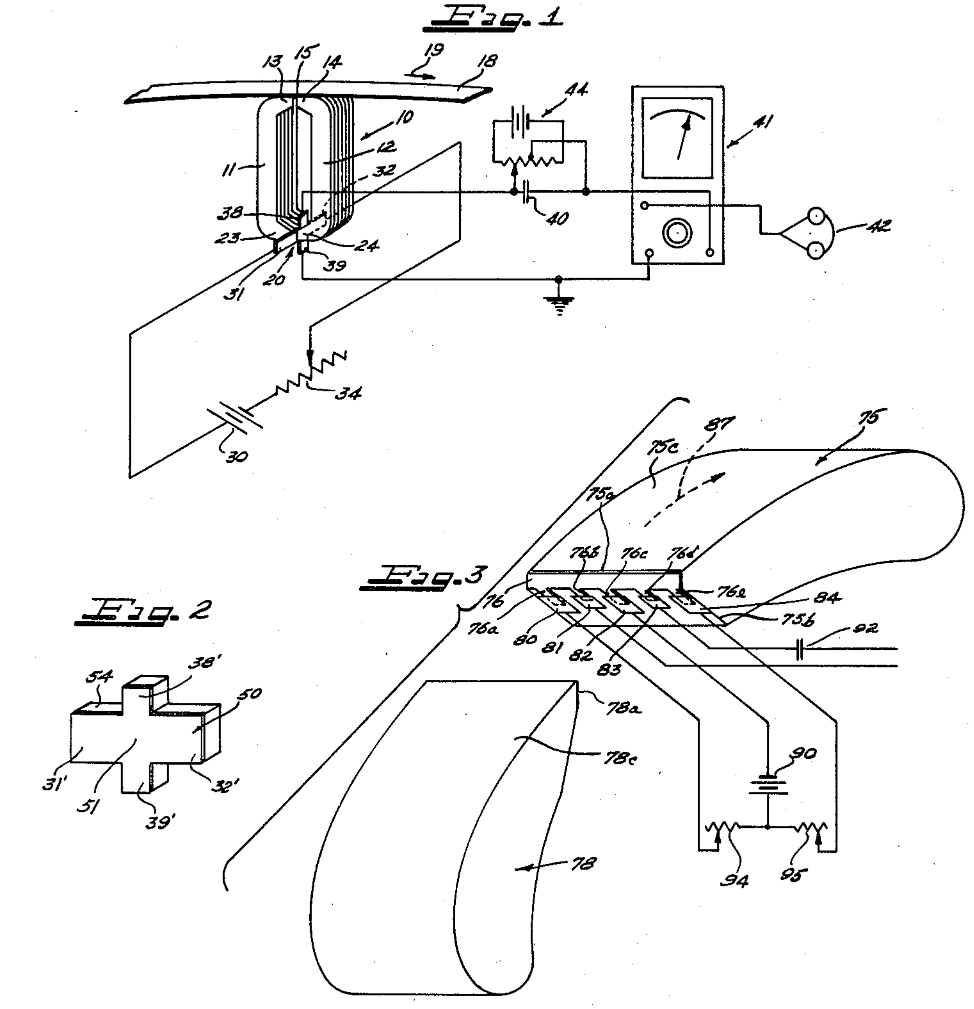
FIGURE 1 is a diagrammatic illustration of a magnetic transducer system and method for reproducing a signal from a magnetic record tape in accordance with the present invention.
FIGURE 2 is a somewhat diagrammatic perspective view of a Hall element for use in the system of FIGURE 1.
FIGURE 3 is a diagrammatic exploded view illustrating a novel transducer head in accordance with a second embodiment of the present invention.

FIGURE 1 illustrates a first embodiment of the present invention wherein a magnetic core 10 comprises a pair of C-shaped core pieces 11 and 12 having confronting pole portions 13 and 14 defining a non-magnetic gap 15 for coupling of the core to a magnetic record medium such as magnetic record tape 18 travelling successively across the poles 13 and 14 in the direction of the arrow 19.

In accordance with the present invention, Hall element 20 is disposed in the magnetic circuit of the core 10 and in the illustrated embodiment is disposed between the ends 23 and 24 of the core pieces 11 and 12. As the tape 18 travels across the gap 15, a magnetic flux is set up in the core 10 which threads the Hall element 20 and varies in accordance with the signal recorded on the record tape 18. In the illustrated embodiment, a battery 30 establishes a current flow through the Hall element between the terminals 31 and 32 thereof, the value of the current being controlled by a resistor 34. The signal flux threads through the central portion of the Hall element 20 generally at right angles to the direction of current flow to produce a corresponding varying electromotive force between the terminals 38 and 39 of the Hall element. This varying electromotive force may be coupled through a suitable capacitor 40 to a suitable indicating device 41 and may also be coupled to headphones such as indicated at 42 or the like for audible reproduction of an audio frequency signal recorded on the tape 18. A conductor may be connected across the terminals of capacitor 40 if indications to D.C. are desired or an adjustable source 44 of D.C. voltage may shunt capacitor 40 for accommodating D.C. signals. The D.C. source 44 also allows compensation for any unbalance in the output from the Hall element 20.

FIGURE 2 illustrates a construction which may be substituted for the Hall element 20 in FIGURE 1, for example. This construction comprises a thin layer 50 of Hall material providing terminals 31′, 32′, 38′, 39′ and providing a central region 51 which is threaded by the magnetic signal flux in a direction generally at right angles to the surface of the region 51. The Hall material may be suitably backed by a member 54 of suitable non-conductive magnetic material such as ferrite. This construction allows insertion of the thin Hall effect material 50 into a magnetic circuit without having the backing member 54 introduce a large non-magnetic gap in the magnetic circuit.

By way of example, the Hall element 20 or 50 may be made of single-crystal 15 ohm-centimeter germanium, approximately one-quarter inch long, 3/64 inch wide and .001 to .020 inch thick in the direction in which the magnetic flux is applied. The core 10 may be of laminated nickel-iron alloy and may be insulated from the Hall element in any suitable manner.

Preferably, the pole portions 13 and 14 are tapered, and the end portions 23 and 24 are filed down or otherwise contoured so as to cover only the active central area of the Hall element.

A greatly improved head construction is illustrated in FIGURE 3 wherein the Hall element may comprise a suitable material having a high Hall coefficient evaporated on an end face *75a* of a core portion 75, the Hall material being indicated at 76. A cooperating core portion 78 has a corresponding end face *78a* identical to the end face *75a* of the core portion 75 for contact with the surface of the Hall element 76 seen in FIGURE 3. Connecting tabs 80–84 may be deposited on a tapered face *75b* of the core portion 75 in overlapping relation to terminal portions *76a–e* integral with the Hall material 76 to facilitate circuit connection with the Hall element. As indicated by the arrow 87, the magnetic record tape travels over the surfaces *78c* and *75c* of the poles and preferably in contact therewith to establish a magnetic signal flux across the gap between the end face *78a* of the core portion 78 and the corresponding end face *75a* of the core portion 75. A battery 90 establishes current flow from the center terminal 82 to the outer terminals 80 and 84 in a direction generally at right angles to the direction of the signal flux linking the Hall element. The intermediate terminals 81 and 83 sense the differential effect of the flux on the oppositely directed currents, and the resultant output may be delivered through capacitor 92 to a suitable output device such as the voltmeter 41 and headphones 42 of FIGURE 1; or direct coupling without capacitor 92 may be used where response to D.C. is required. Suitable variable resistance means 94 and 95 may be provided in series with the terminals 80 and 84 to balance the current flow between terminals 80 and 82 and 82 and 84 respectively, or to give a zero D.C. potential difference between output terminals 81 and 83, or to give slight unbalance if desired.

By way of example, the Hall element 76 may comprise an evaporated film of indium antimonide because it can be made very thin, and because it has a high Hall coefficient. If the core pieces 75 and 78 are of high resistivity ferrite, they can receive the Hall film 76 directly without insulation. If they are of permalloy, "Alfenol," or other metal, then the pole faces *75a* and *78a* should be first insulated with a film of material such as magnesium fluoride.

With the right hand pole pieces 75 of ferrite, the left hand pole piece 78 can be of high permeability metal with an insulating layer of magnesium fluoride to define a sharper edge at the gap between the pole faces *75a* and *78a* of the poles 75 and 78. The terminals *76a–e* of the Hall element are preferably formed on the sloping face *75b* of the pole piece 75 integral with the Hall element film 76 on the end face *75a*. The tabs 80–84 may be of silver, and can be deposited over the lower part of the Hall tabs *76a–e* for providing convenient connections to an external circuit. The conductive tabs 80–84 should be spaced from the main part 76 of the Hall element to avoid partial short circuiting of the current flow paths through the Hall material.

Figure 4:
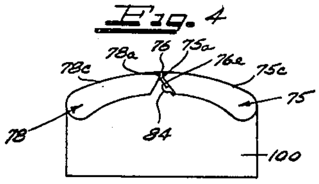
FIG. 4 is an elevational somewhat diagrammatical view of the head of FIGURE 3 and illustrating the mounting therefor.

FIGURE 4 illustrates a completed single head assembly wherein the pole portions 75 and 78 are mounted on a non-magnetic mounting material 100. In the illustrated embodiment, the Hall film 76 acts as the non-magnetic gap spacer for the pole pieces 75 and 78.

Figure 5:
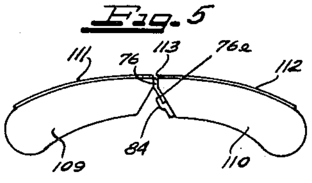
FIGURE 5 illustrates a modified head assembly similar to that shown in FIGURES 3 and 4.

FIGURE 5 illustrates a modified pole piece configuration which is similar to FIGURE 3 but wherein pole portions 109 and 110 are made of ferrite and have permalloy or other high permeability magnetic material with good wearing qualities providing the tape receiving surfaces 111 and 112. By this means a sharper non-magnetic gap 113 is provided. The Hall element may be evaporated on an end face of one of the ferrite pole portions in the same manner as illustrated in FIGURE 3, and for this reason the reference numeral 76 has been applied to the Hall element in both FIGURES 3 and 5. Alternatively, a Hall element of the general configuration illustrated in FIGURE 3 may extend to the top of the gap just below the tape path over the surfaces 111 and 112. If the Hall element terminates below the metal tape-contacting surfaces 111 and 112, a copper gap spacer can be provided between the surface portions 111 and 112.

In both the embodiments of FIGURES 3 and 5, the Hall film 76 may typically have a thickness of between .5 and 5 microns (one micron equals one-millionth of a meter).

Figure 6:
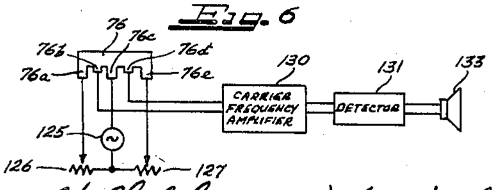
FIGURE 6 illustrates a modified electric circuit for the head of FIGURE 3.

FIGURE 6 illustrates a different manner of energization of a Hall element which may be identical to the Hall element in FIGURE 3 or FIGURE 5 and has been given corresponding reference numerals. In this case, oppositely directed currents are established between terminals *76a* and *76c* and *76c* and *76e* by means of the alternating current source 125, and the currents may be balanced in amplitude by means of the variable resistors 126 and 127. The frequency of the exciting A.C. is generally higher than the highest signal frequency, and may be called the carrier frequency. When the Hall element is subjected to a magnetic signal flux by means of one of the head arrangements such as illustrated in FIGURE 1, 3 or 5, a differential output is created between the terminals *76b* and *76d* which is connected to a carrier frequency amplifier 130 and then to a detector 131. The output of the detector may be delivered to any suitable output device such as a loudspeaker 133. The source 125 preferably has a constant amplitude and a constant frequency above the highest frequency to be detected. The resistors 126 and 127 may be adjusted to give an initial unbalance between the oppositely directed currents in the Hall element to give a linear response through zero input signal, or a phase comparison method of demodulation may be utilized with balanced oppositely directed carrier currents between terminals *76a* and *76c* and *76c* and *76e*, respectively, or a magnetic bias field at the pickup gap can set the quiescent carrier level in a balanced system. When unbalanced exciting currents or a magnetic bias field are used, the detector 131 may take the form of a simple diode detector or rectifier.

Figure 7:
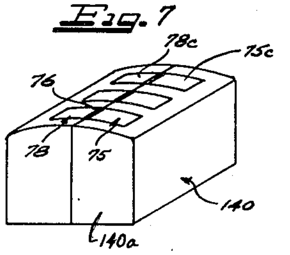
FIGURE 7 illustrates a multiple head assembly in accordance with the present invention utilizing head assemblies in accordance with FIGURE 3 or FIGURE 5.

FIGURE 7 illustrates a series of heads such as illustrated in FIGURE 3 or FIGURE 5 imbedded in a suitable potting compound of non-magnetic material to form a housing 140 for the multiple heads. The heads have been given the same reference numerals as in FIGURE 3 since each may be identical to the head of FIGURE 3.

Figure 8:
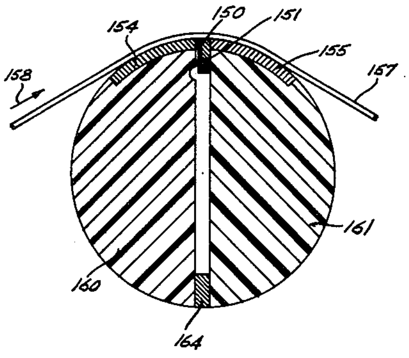
FIGURE 8 is a vertical sectional view of a further head assembly in accordance with the present invention.
Figure 9:
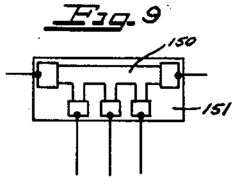
FIGURE 9 is a diagrammatic illustration of the Hall element of the head of FIGURE 8.

FIGURES 8 and 9 illustrate a further embodiment of the present invention wherein a single crystal Hall element 150 is secured to a ferrite wafer 151 and disposed in the gap between a pair of core pieces 154 and 155 which receive a magnetic record medium 157 traveling in the direction of the arrow 158 successively thereacross. The ferrite wafer may form a low reluctance circuit connection with the pole piece 155 so that the non-magnetic gap in the magnetic circuit is defined by the Hall element 150. The pole pieces 154 and 155 may be carried on housing parts 160 and 161 of suitable non-magnetic material such as "Bakelite." A dummy spacer 164 may be provided between the lower parts of the members 160 and 161 of thickness corresponding to the thickness of the ferrite member 151 together with the Hall element 150 thereon. As previously mentioned, suitable insulation or an air gap may be provided between the pole piece 154 and the Hall element 150. The Hall element may be energized by the circuit of FIGURE 3 or by the circuit of FIGURE 6. The Hall element may comprise a single crystal semiconductor ground down as much as possible in the thickness dimension. Single crystals generally give a greater Hall voltage than evaporated films of the same material, sometimes by a factor of about 1000 to 1. The grinding and handling of single crystals are very delicate and painstaking operations under experimental conditions, and are thus helped greatly by a relatively strong backing material such as ferrite. The ferrite wafer 151 may have a thickness of .015 inch and the crystal may be attached to the ferrite wafer before grinding. After grinding the Hall material as thin as possible, the entire element may be shaped by sand blasting through a stencil.

Figure 10:
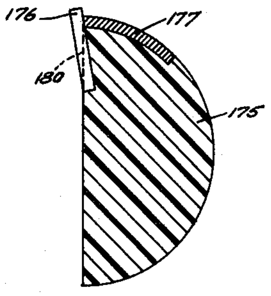
FIGURE 10 is a somewhat diagrammatic vertical sectional view illustrating one step in the method of forming a further head in accordance with the present invention.
Figure 11:
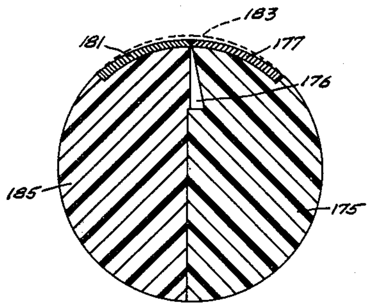
FIGURE 11 illustrates somewhat diagrammatically the completed head assembly produced by the method of FIGURE 10.

For the very finest gaps, ferrites have the disadvantage of "chipping." This can be avoided by the design of FIGURES 10 and 11 where the Hall crystal 176 is first mounted on a non-magnetic side piece 175 to bear against the pole piece 177 carried by the side assembly. The Hall crystal is then ground and polished on a taper as indicated by the dotted line 180 until the crystal just wears through at the edge of the pole piece 177, or shortly before this takes place. After assembly as indicated in FIGURE 11, the tops of the pole pieces 177 and 181 are ground down as indicated at the dotted line 183 until the gap between the pole pieces 181 and 177 has the desired thickness in the direction between the pole pieces. The pole pieces may be of mumetal and the pole piece 181 may be mounted on a mating non-magnetic member 185. It is beneficial to choose the component parts 175 and 177 to have the same or nearly the same coefficient of expansion in relation to the Hall element so that undue stresses are not set up.

When a Hall element such as illustrated in FIGURE 1 or 2 is used as the pick-up gap spacer between a pair of confronting pole pieces in the manner of the Hall elements of FIGURES 3, 4, 5, 8 and 11, there is the problem of connecting to the side of the element adjacent the record corresponding to the terminal 38 in FIGURE 1. This can be accomplished by an electrical connection through the pole piece itself, but the bridge arrangement illustrated in FIGURES 3 and 6 is preferred which omits the top connection adjacent the record medium.

Figure 12:
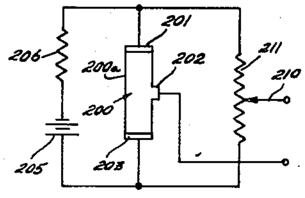
FIGURES 12 to 21 illustrate somewhat diagrammatically further modifications of the present invention.

FIGURE 12 illustrates a further suitable Hall element for use in any one of the preceding heads wherein the Hall element 200 has terminals 201, 202 and 203, and wherein the tape may travel across the edge 200*a* of the element. In this embodiment as well as in the preceding embodiments, the Hall element may itself be embedded in plastic, if satisfactory resolution may be obtained without the use of magnetic pole pieces or with the use of magnetic pole pieces displaced from the Hall element in the manner illustrated, for example, in Camras Serial 532,849 filed September 7, 1955, now Patent No. 2,987,583 issued June 6, 1961, wherein the pole pieces defining the non-magnetic gap engage the active side of the magnetic record tape, and the edge 200*a* of the Hall element would ride on or slightly spaced from the backing side of the magnetic record tape, for example directly opposite to the non-magnetic gap between the pole pieces. A suitable exciting current such as D.C. current from the battery 205 may be supplied to the terminals 201 and 203 of the Hall element through a resistor 206 and the output may be taken between the terminal 202 and the center tap 210 of a resistor 211 connected across the terminals 201 and 203.

Figure 13:
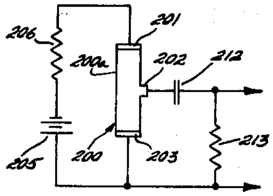

Alternatively as illustrated in FIGURE 13, the same Hall element may be excited in the same manner, but the output may be taken between the center terminal 202 and one of the side terminals 203 through a capacitor 212 and across a resistor 213 to provide an A.C. output component.

The element illustrated in FIGURES 3 and 6, for example, may be considered as a Wheatstone bridge of four resistors made of Hall material, each resistor being provided by the portion of the Hall material between successive terminals such as 80 and 81, 81 and 82, 82 and 83, 83 and 84. When they are in balance, no voltage appears at the output terminals 81 and 83. The presence of a magnetic field unbalances the potential distribution among the "resistors" and gives a net output voltage.

It will be understood that a Hall wafer such as illustrated in FIGURES 1, 2 or 8, for example, may be placed at any point in a ring magnetic head having a conventional pick-up gap cooperating with the record medium, or any other suitable means may be utilized for coupling the Hall element to signal flux from a magnetic record medium.

Figure 14:
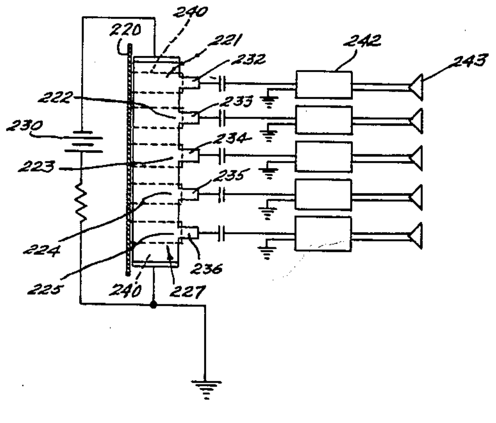

FIGURE 14 illustrates a multichannel Hall head wherein a relatively wide tape 220 has successive tracks thereon cooperating with Hall regions such as 221–225 of an integral single crystal Hall element 227. A single excitation source such as battery 230 may be provided for providing the current flow in each of the regions 221–225, and suitable terminals 232–236 may be provided connecting with the regions 221–225 for receiving the output which varies in accordance with the recorded signal at the respective channels of the record medium 220. Isolated magnetic circuits as indicated by confronting poles 240 may cooperate with the respective regions 221–225 to concentrate signal flux into a path linking the regions 221–225 at right angles to the plane of the crystal. The output terminals 232–236 may each be connected to suitable amplifying means 242 for driving respective output devices such as loudspeaker 243.

Figure 15:
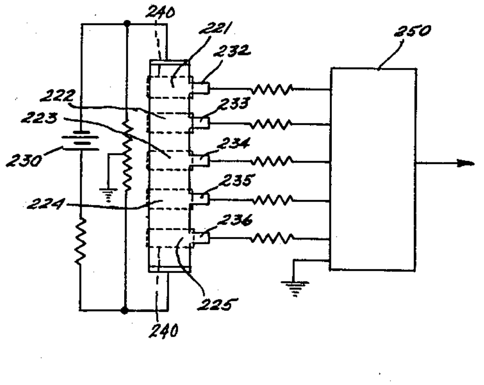

Alternatively, as illustrated in FIGURE 15 a Hall element such as illustrated in FIGURE 14 may cooperate with a single channel tape and the output from the respective regions 221–225 may be connected to an adding circuit indicated at 250. Such a circuit has the possibility of improving signal strength since the Hall effect is concentrated near the terminals such as 232–236 of the element. Thus, greater output is obtainable by using a greater number of terminals and adding the respective outputs from the terminals. A relative reduction in noise is also obtained.

Figure 16:
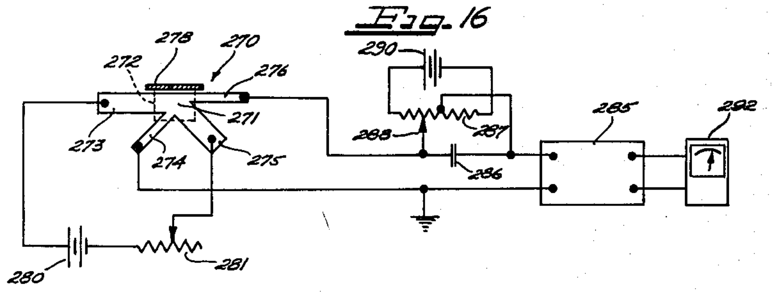

FIGURE 16 illustrates a novel head 270 comprising a sensitive Hall region 271 which receives a magnetic signal field extending at right angles thereto by means such as pole pieces 272 on opposite sides of and in close proximity to the central region 271. The pole pieces may have a configuration such as indicated in FIGURE 1, 4, 5, 8, or 11. For example, the confronting pole pieces 272 on opposite sides of the sensitive region 271 may themselves define the nonmagnetic gap which is directly coupled to a record medium 278 travelling successively over the poles 272. In accordance with the embodiment of FIGURE 16, all of the terminals 273, 274, 275 and 276 connecting with the sensitive region 271 of the Hall element are disposed on the same side of the path of the magnetic record medium. By this means, the Hall element sensitive region 271 may be itself in close proximity to the path of the record medium to receive a maximum signal flux therefrom. In distinction to the preceding embodiment, however, there are provided two voltage output terminals 274 and 276 for the sensitive region instead of a single output terminal as illustrated in FIGURES 3, 6, 9, 12, 13, 14 and 15, for example. By this means, a greatly increased output is obtained for given input current and flux values; better signal to noise ratio is attained; and the output resistance is lowered. The input current is introduced by means of the terminals 273 and 275, and preferably the output terminals 274 and 276 are placed at symmetrical positions along the current flow path through the sensitive region 271 intermediate the input terminals 273 and 275.

A circuit may be utilized in FIGURE 16 similar to that illustrated in FIGURE 1 or 6. For example, a battery 280 in series with a variable resistor 281 may be connected across the current terminals 273 and 275 and the output terminals 274 and 276 may be connected to a suitable amplifier circuit 285 through a capacitor 286. For bypassing direct current output from the head 270, a variable resistor 287 may be provided with a sliding tap 288 for introducing either a positive or a negative bias in series with the output from the Hall element. A suitable bias battery 290 is illustrated as connected across the variable resistor 287 with the movable tap 288 selecting a bias voltage of desired magnitude and polarity. The detector and amplifier device 285 may drive a suitable output device 292.

Figure 17:
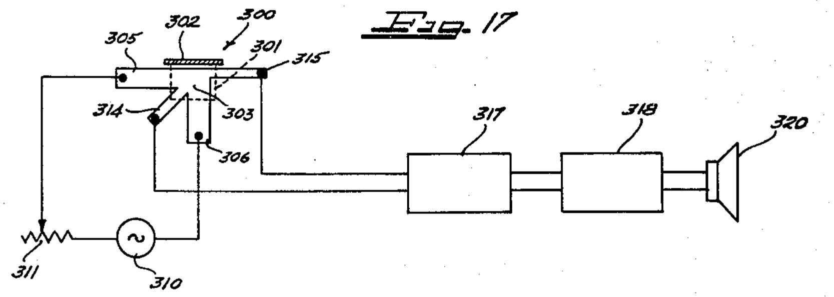

FIGURE 17 illustrates a slightly modified head 300 having pole pieces 301 cooperating with a tape record medium 302 travelling successively across the pole pieces with the Hall element having its sensitive portion 303 disposed in the gap between the confronting pole pieces 301. The current terminals 305 and 306 of the Hall element are connected to an alternating current generator 310 through a variable resistance 311 while the output is taken from the voltage terminals 314 and 315 and delivered to a carrier frequency amplifier 317, a suitable detector 318 and a suitable output device such as loudspeaker 320.

As will be understood by those skilled in the art, the circuit of FIGURE 17 as well as the circuit of FIGURE 6 may be operated so as to obtain three different types of outputs. Under balanced conditions, the output consists of an amplitude modulated carrier which may be demodulated by means of a phase comparison method wherein a constant amplitude signal of the same frequency and of proper phase is mixed with the output signal for example in a bridge rectifier circuit to produce an amplitude modulated wave whose envelope reflects the magnitude and polarity of the input signal and which thus may be detected by means of a suitable diode or rectifier detector.

Alternatively, in the embodiment of FIGURE 17, as well as in the embodiment of FIGURE 6, a magnetic bias field of constant amplitude may be introduced at the sensitive region 303 of the Hall element and substantially in the same direction as the signal flux, but greater than the maximum negative flux from the record so as to produce an amplitude modulated output which may be demodulated directly by a simple diode or rectifier detector. An output signal whose envelope varies with the input signal flux may also be obtained by introducing an imbalance between the output terminals 314 and 315 in such a manner that there is a carrier output with no magnetic flux linking the Hall element. This may be accomplished by displacing the terminals 314 and 315 relative to the axis of symmetry of the current flow path through the Hall element, or in FIG. 6 by adjusting resistors 126 and 127 to give the desired unbalance in exciting current between the two current flow paths.

Figure 18:
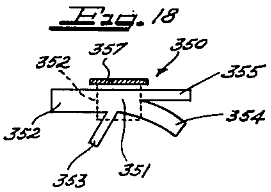

FIGURE 18 illustrates a further slightly modified form of head 350 having a sensitive Hall portion 351 disposed between confronting pole portions 352 in the same manner as previously described and having all four terminals 352, 353, 354 and 355 on the same side of the path of the record medium indicated at 357. The current terminals 352 and 354 may be connected in either of the circuits illustrated in FIGURES 16 and 17, for example, while the output terminals 353 and 355 may be connected to a suitable output circuit depending on the character of the output waveform from the head as previously discussed.

Figure 19:
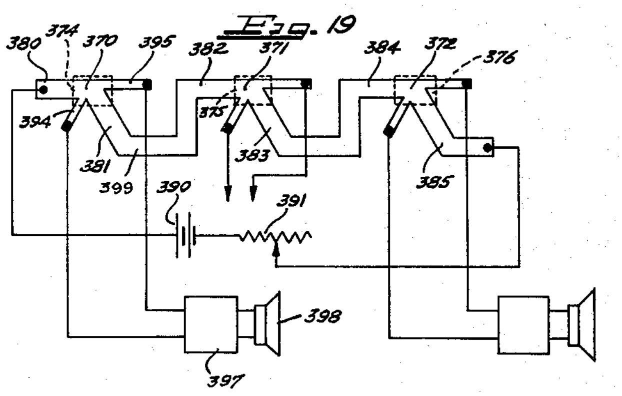

FIGURE 19 illustrates a multiple arrangement of Hall elements wherein the successive sensitive regions 370, 371 and 372 are disposed between pairs of confronting pole portions 374, 375 and 376 in any one of the manners previously described. By way of example, a single tape record medium (not shown) may have adjacent channels thereof travelling over the respective pole portions 374, 375 and 376. The successive current terminals 380–385 are connected integrally in series as illustrated and may be energized in series by means of a battery 390 and variable resistor 391. The output from each set of voltage terminals such as 394 and 395 may be connected to a separate amplifier circuit such as 397 and a suitable output device such as loudspeaker 398.

It will be apparent that the heads herein disclosed are susceptible to manufacture by printed circuit techniques. For example in FIGURE 19, the multiple Hall element configuration may be deposited on a suitable support of magnetic non-conductive material, such as the inner face of one of the parts making up the head assembly of FIGURE 7. For example, the Hall element of FIGURE 19 may have its sensitive portions 370, 371 and 372 deposited on the end faces of the respective poles 75 (corresponding to poles 374–376 in FIGURE 19) while the integral connecting portions such as 399 of the Hall element would extend along the flush inner face of the housing part 140*a* in FIGURE 7. The electrical conductive connections to the various terminals may likewise be formed by a printed circuit technique. If conductive pole pieces are used in any of the embodiments, it will be appreciated that suitable insulation should be interposed such as previously described.

Figure 20:
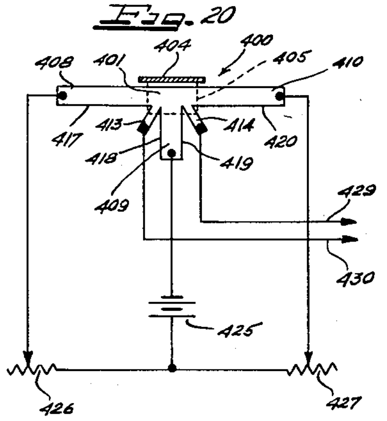

FIGURE 20 illustrates a further modified head 400 having a sensitive Hall region 401 for receiving a magnetic signal flux from a magnetic record medium 404. By way of example, a pair of confronting poles 405 may define a non-magnetic gap for coupling to the record medium 404, and the sensitive region 401 may be disposed in the lower portion of this gap between the poles 405. The Hall element has current terminals 408, 409 and 410 designed to produce current flow past the output terminals 413 and 414. The output terminals 413 and 414 may be disposed at the corners defined by the margins 417, 418 and 419, 420 of the Hall element, or the output terminals may be displaced from the corners somewhat along the margins 417 and 420, or along the margins 418 and 419. This embodiment has the advantage over the embodiments of FIGURES 16 to 19 of being entirely symmetrical.

Current is supplied to the terminals 408, 409 and 410 by means of a battery and variable resistors 426 and 427 while the output is taken by means of conductors 429 and 430 which may lead to suitable amplification circuits and a suitable output device such as a loudspeaker as in the previous embodiments.

Figure 21:
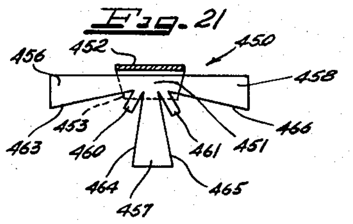

FIGURE 21 illustrates a further modification similar to FIGURE 20 wherein a head 450 includes a sensitive Hall region 451 for coupling to a magnetic record medium 452 by means of confronting poles 453 as in the preceding embodiments. In this embodiment, the flux sensitive portion 451 of the Hall element is relatively constricted and the current terminals 456, 457 and 458 are of flaring construction to provide relatively wide portions for connection with the electric circuit which may be identical to that illustrated in FIGURE 20. Output terminals 460 and 461 are disposed on opposite sides of the current flow paths through the sensitive portion 451 and may be exactly at the corners between margins 463, 464 and 465, 466 or may be displaced from the corners along the margins 463 and 466 or along the margins 464 and 465 as in the preceding embodiment.

This construction with the constricted flux sensitive area provides a smaller portion of the element in relation to the tab or terminal portions thereof which simplifies handling and making connections, and at the same time allows concentration of the available flux into a smaller portion of the element to give maximum output and maximum signal-to-noise ratio.

It will be apparent that many modifications and variations may be effected without departing from the scope of the novel concepts of the present invention.

We claim as our invention:

1. In combination, a Hall element, means for establishing a current flow along one axis of said element, means for coupling said element to a magnetic record medium for establishing a magnetic signal flux from said record medium along a second axis in said element, and means connected with said element for obtaining an electrical output from said element varying in accordance with the signal flux from said record medium, said coupling means comprising a pair of confronting pole portions, and said Hall element being deposited on the face of one of said pole portions, said one pole portion having a sloping face joining with said pole face, and electrical terminal portions deposited on said sloping face and connecting with successive portions of said Hall element to provide terminals therefore, said pole portions and said Hall element being disposed in immediate proximity to the path of the record medium, and said electrical output means being outside of the space between said pole portions and being arranged to sense a Hall voltage produced in said Hall element by magnetic flux threading said element along said second axis thereof.

2. In combination, a Hall element, means for establishing a current flow along one axis of said element, means for coupling said element to a magnetic record medium of establishing a magnetic signal flux from said record medium along a second axis in said element, and means connected with said element for obtaining an electrical output from said element varying in accordance with the signal flux from said record medium, said coupling means comprising a pair of confronting pole portions, and said Hall element consisting of a solid non-deposited layer of bulk material and being of tapered configuration with the minimum thickness portion thereof being disposed between said pole portions to define a tapering non-magnetic gap therebetween and said minimum thickness portion terminating in an edge immediately adjacent the path of the record medium.

3. In combination, a Hall effect semiconductor element having at least two sensitive regions, means for establishing electric current flow in each of said regions, means for coupling said regions to adjacent portions of a magnetic record medium, each of said regions having only a single output terminal associated therewith, means connected with said current flow establishing means for providing a common reference point separate and remote from said sensitive regions to serve as a second output terminal of each of said regions, a pair of separate amplifiers, said pair of separate amplifiers each having a pair of input terminals, and means for connecting each of the output terminals associated with said regions of said element to a first one of the input terminals of one of the respective separate amplifiers and for connecting the common reference point with the other one of the input terminals of each of said separate amplifiers.

4. In combination, a Hall effect semiconductor element having at least two sensitive regions, means for establishing electric current flow in each of said regions, means for coupling said regions to adjacent portions of a magnetic record medium, each of said regions having only a single output terminal associated therewith, means connected with said current flow establishing means for providing a common reference point separate and remote from said sensitive regions to serve as a second output terminal of each of said regions, and means comprising an adding circuit connected to said output terminals and to said common reference point for summing the outputs from said regions of said element.

5. A Hall element comprising a support, a film of Hall element material deposited along said support and having a series of flux sensitive portions lying generally in a common plane for coupling to a magnetic record medium to receive magnetic signal flux from the record medium through the thickness dimension of said film, means for energizing said flux sensitive portions in series to define a current flow path through the successive flux sensitive regions, and electrical output means connected to each of the flux sensitive regions including output terminals at respective opposite sides of the current flow path through each of the sensitive regions.

6. A magnetic flux sensitive element comprising a generally T-shaped Hall body including opposite arm portions, a flux sensitive region intermediate the arm portions, and a stem portion extending from the sensitive region, means for establishing current flow paths from the respective arm portions of said body to the stem portion through the sensitive region, and output terminals connected to the body portion at the sensitive region thereof.

7. A magnetic flux sensitive element comprising a generally T-shaped Hall body including opposite arm portions, a flux sensitive region intermediate the arm portions, and a stem portion extending from the sensitive region, means for establishing current flow paths from the respective arm portions of said body to the stem portion through the sensitive region, and output terminals connected to the body portion at the sensitive region thereof, said output terminals being connected to the body directly at the opposite margins of said stem portion.

8. A magnetic flux sensitive element comprising a generally T-shaped Hall body including opposite arm portions, a flux sensitive region intermediate the arm portions, and a stem portion extending from the sensitive region, means for establishing current flow paths from the respective arm portions of said body to the stem portion through the sensitive region, and output terminals connected to the body portion at the sensitive region thereof, said terminals being connected with the the body directly at the corners between the respective arm portions and the stem portion.

9. A magnetic flux sensitive element comprising a generally T-shaped Hall body including opposite arm portions, a flux sensitive region intermediate the arm portions, and a stem portion extending from the sensitive region, means for establishing current flow paths from the respective arm portions of said body to the stem portion through the sensitive region, and output terminals connected to the body portion at the sensitive region thereof, the arm portions and stem portion converging toward the sensitive region and being of reduced cross section adjacent the sensitive region in comparison to the cross section at the respective extremities thereof.

10. In combination, a magnetic record medium having a signal recorded thereon, and means for electrically reproducing the recorded signal comprising a Hall element having a relatively small thickness dimension and relatively greater length and width dimensions transverse to the thickness dimension, the length dimension of the element terminating in opposite longitudinal ends, said Hall element receiving signal flux from the record medium predominantly through the thickness dimension thereof, means connected to the opposite longitudinal ends of the Hall element for establishing a substantial electric potential between said opposite longitudinal ends and for producing electric current flow along the length dimension of the element, the element having an edge adjacent the record medium and having output terminals connected to the element at opposite sides of the longitudinal dimension of the element for providing an output electric signal in accordance with the interaction between the signal flux threading the thickness dimension of said element and said electric current flow.

11. In combination, magnetic core means having a first gap for coupling to a magnetic record medium having a signal recorded thereon and having a second gap across which a signal magnetomotive force is produced by the portion of the magnetic record medium at said first gap, a support of magnetic material in said second gap having opposite flat surfaces disposed transversely to the length dimension of said gap and substantially parallel to each other with the thickness dimension of said support between said flat surfaces being slightly less than the length dimension of said second gap, a thin film of Hall material secured to one of said flat surfaces of said support for receiving signal flux through the thickness dimension thereof, means connected to said Hall material for establishing an electric current flow therein generally in the plane of said film, and means coupled to said Hall material for producing an electric output in accordance with the interaction of said signal flux and said electric current flow.

12. A flux sensitive device comprising a generally flat Hall element including a body portion of Hall material defining a flux sensitive region, an input terminal portion of Hall material and an output terminal portion of Hall material extending from opposite ends of the body portion, and a further input terminal portion of Hall material and a further output terminal portion of Hall material extending from one side of said body portion, the side of said body portion opposite said one side being free of terminal portions to facilitate placing of the side of said body portion opposite said one side in close relation to a magnetic flux source.

13. A flux sensitive device comprising a generally flat Hall element including a body portion of Hall material defining a flux sensitive region, input terminal portions of Hall material disposed generally at right angles to each other to define a current flow path through the flux sensitive region of the body portion, and output terminal portions of Hall material connected to opposite sides of the current flow path in said body portion, said body portion having a free edge portion at one side thereof unobstructed by terminal portions to facilitate placing of said side of said body portion in close proximity to a magnetic flux source.

14. A flux sensitive device comprising a generally flat Hall element including a body portion of Hall material defining a flux sensitive region, input terminal portions of Hall material extending from said body portion in respective different directions defining an oblique angle in the plane of said body portion and defining a current path through the flux sensitive region of the body portion, and output terminal portions of Hall material extending from said body portion at opposite sides of the current flow path in the body portion, said body portion having a free edge at one side thereof unobstructed by terminal portions to facilitate placing of said one side of said body portion in close proximity to a magnetic flux source.

15. In combination, magnetic core means having a first gap for coupling to a magnetic record medium having a signal recorded thereon and having a second gap across which a signal magnetomotive force is produced by the portion of the magnetic record medium at said first gap, a support of substantially non-conductive magnetic material in said second gap having opposite surfaces disposed transversely to the length dimension of said gap and substantially parallel to each other with the thickness dimension of said support between said flat surfaces being slightly less than the length dimension of said gap, a thin film of Hall material having a thickness many times less than the thickness dimension of said support secured to one of said flat surfaces of said support for receiving signal flux through the thickness dimension thereof, means connected to said Hall material for establishing an electric current flow therein generally in the plane of said film, and means coupled to said Hall material for producing an electric output in accordance with the interaction of said signal flux and said electric current flow, said film of Hall material comprising a solid non-deposited layer of bulk material.

16. A magnetic playback head comprising magnetic core means providing a magnetic circuit for coupling with a magnetic record medium, said magnetic circuit including a pair of core pieces having a gap therebetween and a magnetic flux sensitive assembly interposed in said gap for sensing signal flux threading said magentic circuit, said magnetic flux sensitive assembly comprising a relatively thin Hall element having its thickness dimension arranged in the direction across said gap and a relatively thick and rigid backing member mounting said Hall element and providing a rigid backing therefor, said backing member having its thickness dimension arranged in the direction across said gap and substantially filling said gap except for the region thereof occupied by said Hall element, and said backing member being of non-metallic magnetic material.

17. In combination, magnetic core means providing a magnetic circuit and including a pair of core pieces having a gap therebetween and a magnetic flux sensitive assembly interposed in said gap for sensing magnetic flux threading said magnetic circuit, said magnetic flux sensitive assembly comprising a relatively thin Hall element having its thickness dimension arranged in the direction across said gap and a relatively thick and rigid backing member mounting said Hall element and providing a rigid backing therefor, said backing member having its thickness dimension arranged in the direction across said gap and substantially filling said gap except for the region thereof occupied by said Hall element, and said backing member being of non-metallic magnetic material and having a thickness of the order of .015 inches.

18. The combination of claim 17 with said Hall element comprising a single crystal material secured to said backing member.

19. In combination, a magnetic record medium having an elongated channel with a signal recorded thereon longitudinally of the channel, and means for electrically reproducing the recorded signal comprising a Hall element having a relatively small thickness dimension and relatively greater length and width dimensions transverse to the thickness dimension, the length dimension of the Hall element terminating in opposite longitudinal ends, said Hall element receiving signal flux from the record medium predominantly through the thickness dimension thereof, means connected to the opposite longitudinal ends of the Hall element for establishing a substantial electrical potential between said opposite longitudinal ends and for producing electric current flow along the length dimension of the element, the element having an edge adjacent said channel of the record medium of a length generally corresponding to the width of the channel and having output terminals connected to the element at opposite sides of the longitudinal dimension of the element, one of the output terminals being connected to an edge opposite said edge adjacent the record medium, and the other of said output terminals being connected to a portion of the Hall element immediately adjacent but laterally offset from said edge adjacent the record medium.

References Cited in the file of this patent

UNITED STATES PATENTS

| | | |
|---|---|---|
| 2,464,807 | Hansen | Mar. 22, 1949 |
| 2,531,642 | Potter | Nov. 28, 1950 |
| 2,553,490 | Wallace | May 15, 1951 |
| 2,866,013 | Reis | Dec. 23, 1958 |
| 2,900,451 | Havstad | Aug. 18, 1959 |
| 2,901,549 | Serrell | Aug. 25, 1959 |
| 2,907,834 | Duinker et al. | Oct. 6, 1959 |
| 2,978,545 | Howling | Apr. 4, 1961 |

FOREIGN PATENTS

| | | |
|---|---|---|
| 1,132,782 | France | Nov. 5, 1956 |